(12) United States Patent
Craciunas et al.

(10) Patent No.: US 10,958,563 B2
(45) Date of Patent: Mar. 23, 2021

(54) METHOD AND DEVICE TO CONFIGURE REAL-TIME NETWORKS

(71) Applicant: TTTech Computertechnik AG, Vienna (AT)

(72) Inventors: Silviu Craciunas, Vienna (AT); Ramon Serna Oliver, Vienna (AT)

(73) Assignee: TTTECH COMPUTERTECHNIK AG, Vienna (AT)

( * ) Notice: Subject to any disclaimer, the term of this patent is extended or adjusted under 35 U.S.C. 154(b) by 113 days.

(21) Appl. No.: 16/147,927

(22) Filed: Oct. 1, 2018

(65) Prior Publication Data
US 2019/0104055 A1 Apr. 4, 2019

(30) Foreign Application Priority Data

Oct. 4, 2017 (EP) ..................................... 17194686

(51) Int. Cl.
*H04L 12/24* (2006.01)
*H04L 12/721* (2013.01)
(Continued)

(52) U.S. Cl.
CPC .......... *H04L 45/14* (2013.01); *H04L 41/0873* (2013.01); *H04L 41/0883* (2013.01);
(Continued)

(58) Field of Classification Search
CPC . H04L 41/00–5096; H04L 47/10–6295; H04L 45/14
See application file for complete search history.

(56) References Cited

U.S. PATENT DOCUMENTS 5,678,006 A * 10/1997 Valizadeh ........... H04L 41/0213
709/220
9,141,354 B2 * 9/2015 Kuznetsov ................ G06F 8/42
(Continued)

FOREIGN PATENT DOCUMENTS

| DE | 202014101348 U1 | 5/2014 |
| EP | 1777919 A1 | 4/2007 |
| WO | 2017082779 A1 | 5/2017 |

OTHER PUBLICATIONS

Abraham, Erika, and Gereon Kremer. "Satisfiability checking: Theory and applications." International Conference on Software Engineering and Formal Methods. Springer, Cham, 2016. (Year: 2016).*

(Continued)

*Primary Examiner* — David R Lazaro
*Assistant Examiner* — Julian Chang
(74) *Attorney, Agent, or Firm* — Eversheds Sutherland (US) LLP

(57) ABSTRACT

A method to configure nodes in a real-time network, which nodes are connected with links to each other directly or indirectly via other nodes and communicate with each other using said links by exchanging frames, wherein: (i) at least one node (a) associates at least one queue with at least one link, (b) is connected to said at least one queue, and (c) places frames in said at least one queue for transmission on the associated link, (ii) said at least one queue is associated with a gate which can be in an open or closed state, (iii) said at least one node selects frames that are placed in said at least one queue on the at least one link associated with said queue for transmission if the gate associated therewith is in the open state and does not select frames for transmission when said gate is in the closed state, (iv) said gate changes the state with the progress of time from open to closed and vice versa to form windows as indicated by configuration data, (v) said (Continued)

configuration data is produced by a tool capable of solving constraints in array theory, (vi) said tool accepts input formulated as constraints in array theory, (vii) said input is provided to said tool by human user input and/or by communication requests from one or more nodes in the real-time network, and (viii) said configuration data is communicated to one or more nodes in the real-time network, nodes which apply part or all of said configuration data as local configuration.

14 Claims, 4 Drawing Sheets

(51) Int. Cl.
*H04L 12/841* (2013.01)
*H04L 12/851* (2013.01)
*H04L 12/801* (2013.01)

(52) U.S. Cl.
CPC ............ *H04L 45/127* (2013.01); *H04L 47/24* (2013.01); *H04L 47/28* (2013.01); *H04L 47/34* (2013.01)

(56) References Cited

U.S. PATENT DOCUMENTS

| | | | | |
|---|---|---|---|---|
| 10,511,455 | B1* | 12/2019 | Sharma | H04L 47/2433 |
| 2004/0049474 | A1* | 3/2004 | Shankar | G06N 5/04 706/46 |
| 2008/0089245 | A1* | 4/2008 | Reichstein | H04L 12/462 370/256 |
| 2009/0207568 | A1 | 8/2009 | Haveri | |
| 2010/0299654 | A1* | 11/2010 | Vaswani | G06F 11/366 717/128 |
| 2011/0078665 | A1* | 3/2011 | Gulwani | G06F 11/302 717/131 |
| 2011/0138369 | A1* | 6/2011 | Chandra | G06F 9/4491 717/133 |
| 2011/0228489 | A1 | 9/2011 | Emery et al. | |
| 2013/0305341 | A1* | 11/2013 | Baker | H04L 47/828 726/11 |
| 2014/0362705 | A1* | 12/2014 | Pan | H04L 45/00 370/237 |
| 2016/0127246 | A1* | 5/2016 | Ashwood-Smith | H04W 56/00 370/350 |
| 2017/0006067 | A1* | 1/2017 | Narain | H04L 41/0823 |
| 2017/0118083 | A1* | 4/2017 | Bjorner | H04L 41/0873 |
| 2017/0331748 | A1* | 11/2017 | Mangin | H04L 47/826 |
| 2018/0026854 | A1* | 1/2018 | Bhatia | H04L 41/0213 715/735 |
| 2018/0183708 | A1* | 6/2018 | Farkas | H04L 45/38 |
| 2018/0237039 | A1* | 8/2018 | Mong | B61L 15/0081 |
| 2018/0302330 | A1* | 10/2018 | Bush | H04L 47/125 |
| 2018/0302331 | A1* | 10/2018 | Bush | H04L 47/28 |
| 2018/0309656 | A1* | 10/2018 | Regev | G06F 11/273 |
| 2018/0316557 | A1* | 11/2018 | Frangieh | H04L 67/34 |
| 2018/0316592 | A1* | 11/2018 | Ellegaard | H04L 43/106 |
| 2019/0007344 | A1* | 1/2019 | Mangin | H04L 47/31 |
| 2019/0007443 | A1* | 1/2019 | Cook | G06F 21/577 |
| 2019/0104073 | A1* | 4/2019 | Choi | H04L 47/245 |
| 2019/0166061 | A1* | 5/2019 | Farkas | H04L 47/627 |
| 2019/0199642 | A1* | 6/2019 | Jiang | H04L 43/12 |
| 2019/0327181 | A1* | 10/2019 | Dilger | H04L 45/02 |

OTHER PUBLICATIONS

Craciunas, Silviu S., et al. "Scheduling real-time communication in IEEE 802.1 Qbv time sensitive networks." Proceedings of the 24th International Conference on Real-Time Networks and Systems. 2016. (Year: 2016).*

Craciunas, Silviu S., and Ramon Serna Oliver. "SMT-based task- and network-level static schedule generation for time-triggered networked systems." Proceedings of the 22nd international conference on real-time networks and systems. 2014. (Year: 2014).*

European Search Report for European Application No. 17194686.6, dated Mar. 19, 2018 (13 pages).

Pop, P., et al., Design Optimisation of Cyber-Physical Distributed Systems Using IEEE Time-Sensitive Networks, IET Cyber-Physical Systems: Theory & Applications, Dec. 2016, pp. 86-94, vol. 1, Issue 1.

Craciunas, S., et al., Scheduling Real-Time Communication in IEEE 802.1Qbv Time Sensitive Networks, RTNS'16 Proceedings of the 24th International Conference on Real-Time Networks and Systems, pp. 183-192, published Oct. 2016 (10 pages).

Durr, F., et al., No-wait Packet Scheduling for IEEE Time-Sensitive Networks (TSN), RTNS'16 Proceedings of the 24th International Conference on Real-Time Networks and Systems, pp. 203-212, published Oct. 2016 (10 pages).

Farzaneh, M., et al., A Graphical Modeling Tool Supporting Automated Schedule Synthesis for Time-Sensitive Networking, ETFA'16 Proceedings of the 22nd IEEE International Conference on Emerging Technologies and Factory Automation, published Sep. 2017 (8 pages).

Time Sensitive Networking Task Group of IEEE 802.1, Draft Standard for Local and Metropolitan Area Networks—Bridges and Bridged Networks—Amendment: Enhancements for Scheduled Traffic, IEEE P802.1Qbv/D3.1, issued Sep. 22, 2015 (52 pages).

Bradley, A., et al., What's Decidable About Arrays?, VMCAI 2006: Verification, Model Checking, and Abstract Interpretation, pp. 427-442, Lecture Notes in Computer Science, vol. 3855, Springer-Verlag Berlin Heidelberg (2005).

Internet Engineering Task Force, Network Configuration Protocol (NETCONF), published Jun. 2011 (113 pages).

Internet Engineering Task Force, Yang—A Data Modeling Language for the Network Configuration Protocol (NETCONF), published Oct. 2010 (173 pages).

Object Management Group, Data Distribution Service (DDS), Version 1.4, published Apr. 2015 (180 pages).

Network Working Group, An Architecture for Describing Simple Network Management Protocol (SNMP) Management Frameworks, published Dec. 2002 (384 pages).

First Office Action for Austrian priority Application No. A 50317/2016 dated Feb. 21, 2017.

International Search Report for PCT/AT2017/060085 dated Jun. 20, 2017.

\* cited by examiner

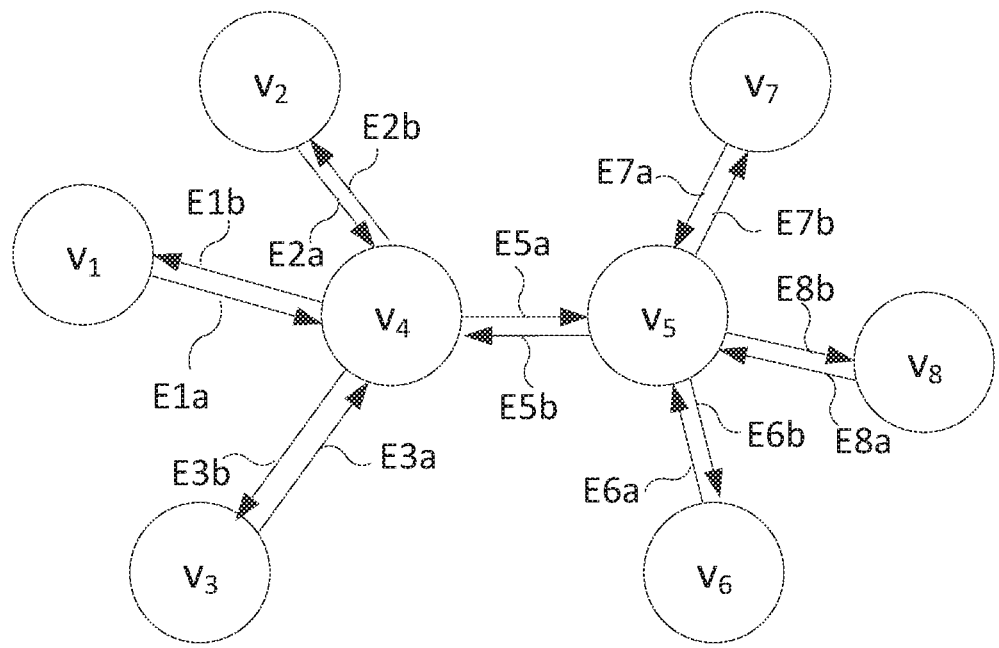
Fig. 1 (State-of-the-art)
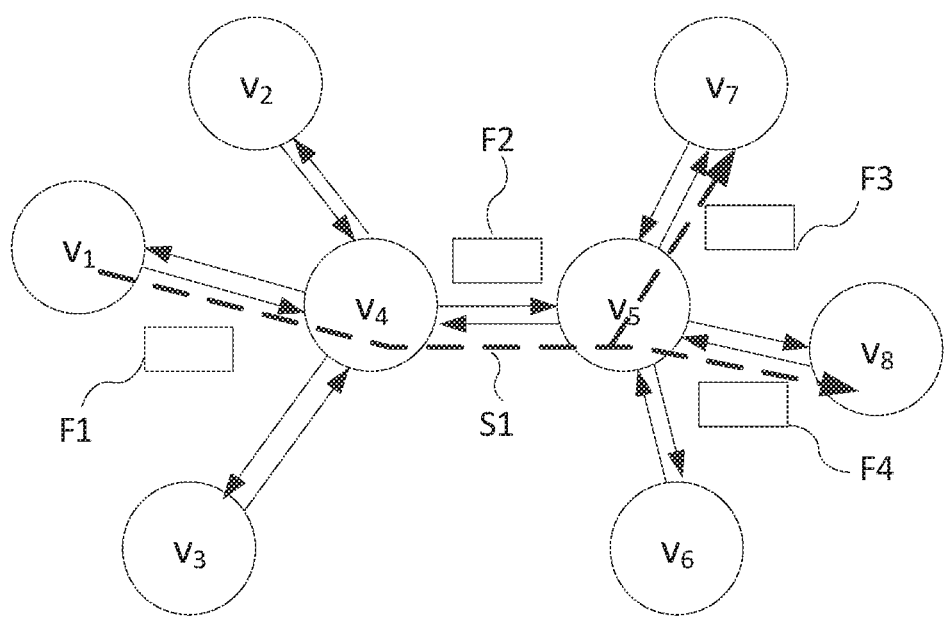
Fig. 2 (State-of-the-art)

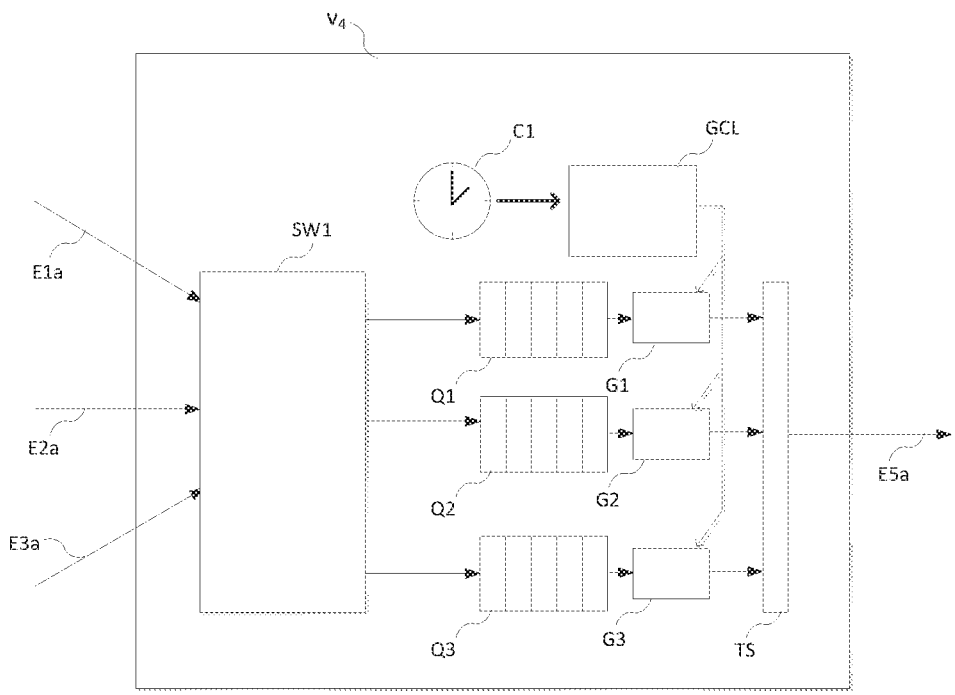
Fig. 3 (State-of-the-art)
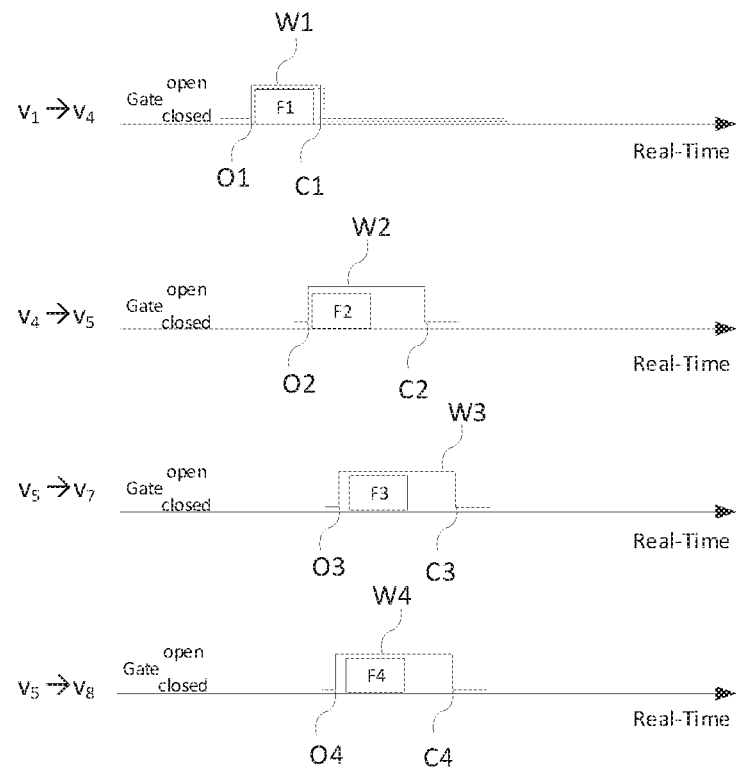
Fig. 4 (State-of-the-art)

METHOD AND DEVICE TO CONFIGURE REAL-TIME NETWORKS

CROSS-REFERENCE TO RELATED APPLICATIONS

This application claims priority to European Patent Application No. 17194686.6, filed Oct. 4, 2017, which is incorporated herein by reference.

FIELD OF TECHNOLOGY

The invention relates to a method for configuring nodes in a real-time network, which nodes of the real-time network are connected with links to each other directly or indirectly via other nodes and communicate with each other using said links by exchanging frames, wherein at least one node associates at least one queue with at least one link, wherein said at least one node is connected to said at least one queue, and wherein said at least one node places frames in said at least one queue for transmission on the associated link, and wherein said at least one queue is associated with a gate which can be in an open state or in a closed state, and wherein said at least one node selects frames that are placed in said at least one queue on the at least one link associated with said queue for transmission if the state of the gate associated with said queue is in the open state and does not select frames for transmission from said queue on said link when said gate is in the closed state, and wherein said gate changes the state with the progress of time from open to closed and from closed to open to form windows as indicated by configuration data.

Furthermore the invention relates to a device to configure nodes in a real-time network as mentioned above.

Finally, the invention relates to a real-time network comprising at least one device for configuring node according to the invention.

The invention relates to generating configuration data for networks with real-time guarantees. For example such a real-time network may implement IEEE 802.1Qbv [1] which defines a time-aware shaping mechanism for the transmission of scheduled frames. A time-aware shaper is a gating mechanism executed at the egress side of a queue. This gating mechanism dynamically enables or disables the selection of frames from the respective queue based on a predefined configuration data. In the example of IEEE 802.1Qbv this configuration data GCL is referred to as Gate Control List.

In particular, IEEE 802.1Qbv defines a gate for each queue of an egress port, which at a given time can be in one of two defined states: open or closed. When the gate is in the open state, frames may be selected from the respective queue for transmission to the physical link in first-in first-out order. If the gate is in the closed state, frames from the respective queue are not selected. The points in time of state changes are calculated offline and the state changes are then executed during operation with respect to a synchronized time in the network.

SUMMARY OF THE INVENTION

It is an objective of the invention to ease the configuration of real-time networks as well as to improve the performance of generation of configuration data.

This objective is achieved with a method described above, which is characterized in that said configuration data is produced by a tool, wherein said tool is capable of solving constraints in array theory, and wherein said tool accepts input, which input is formulated as constraints in array theory, and wherein said input is provided to said tool by means of human user input and/or by means of communication requests from one, two, or more nodes in the real-time network, and wherein said configuration data is communicated to one, two, or more nodes in the real-time network, node or nodes which applies/apply at least parts of said configuration data or said configuration data as local configuration.

Furthermore, this objective is achieved with a device mentioned above, characterized in that the device is capable of producing configuration data by executing a tool, where said tool is capable of solving constraints in array theory, and wherein said tool is configured to accept input, which input is formulated as constraints in array theory, wherein said input is provided to said tool by means of human user input and/or by means of communication requests from one, two, or more nodes in the real-time network, and wherein the device is configured to communicate said configuration data to the one, two, or more nodes in the real-time network, which applies/apply at least parts of said configuration data as local configuration.

Finally, this objective is achieved with a real-time network described in the introduction, wherein for configuring nodes of the real-time network the real-time network comprises at least one device as mentioned above.

The configuration method is disclosed via the formulation of constraints encoding the dependencies between variables denoting among others the open and close instants of time for scheduled windows as well as the assignment of transmitted frames to a particular window. The encoding of these constraints may be formalized in different ways, enabling the use of tools like specialized solvers to search for a satisfiable solution. We particularly address the appropriateness of first-order theory of arrays (also called theory of arrays or array theory in this application) [2] as a suitable means of encoding the constraints derived from the scheduling problem that can be then solved by general purpose tools, like SMT solvers.

The first-order theory of arrays ($\Im_A$) is build around two interpreted function symbols: select, used to return an element of an array from a certain index, and store, used to write an element into an array at a certain index. In addition to the usual operators from linear integer arithmetic, we use the syntax presented in [2] to introduce array theory and express the scheduler constraints. Usually, the signature of $\Im_A$ is defined as $\Sigma_A$: $\{\cdot[\cdot], \cdot\langle\cdot\leftarrow\cdot\rangle, =\}$. In [2], the sorts array, elem, and index are used for arrays, elements, and indices, respectively. Furthermore, the syntax a[i] is used for the select function of the element at index i from array a and a $\langle i\leftarrow e\rangle$ is used for the store operation of element e in array a at index i. The main two axioms of array theory are [2]:

$$\forall a\text{:array}, \forall i,j\text{:index}, \forall x\text{:elem}$$

$$i=j \rightarrow a\langle i\leftarrow x\rangle [j]=x$$

$$i\neq j \rightarrow a\langle i\leftarrow x\rangle [j]=a[j]$$

Together with axioms of linear integer arithmetic these form the theory of integer-indexed arrays ($\mathcal{T}_A^{(\mathbb{Z})}$) which we use to express our scheduling constraints.

Advantageous embodiments of the method, the device, and the real-time network described above are detailed hereinafter:

Some of the constraints in array theory may be well-formed windows constraints and/or queue assignment constraints and/or stream instance constraints and/or ordered windows constraints and/or frame-to-window assignment constraints and/or window size constraints and/or stream constraints and/or stream isolation constraints.

An SMT-solver may be used as said tool that is capable of solving expressions in array theory.

OPC/UA and/or DDS and/or NETCONF/YANG and/or SNMP and/or FTP is or may be used to communicate the communication requirements to said tool and/or to communicate configuration data to the nodes.

Each node of the real-time network may be one selected from a group consisting of an Ethernet switch, a router and an end station.

The state change from open to closed and closed to open may be executed according the IEEE 802.1Qbv standard.

A synchronized time may be established in the nodes, preferably by means of the IEEE 1588 standards and/or the IEEE 802.1AS standards and/or the SAE AS6802 standard or any revision of said standards.

BRIEF DESCRIPTION OF FIGURES

In the following, in order to further demonstrate the present invention, illustrative and non-restrictive embodiments are discussed, as shown in the drawings. In the drawings FIG. 1 depicts an example of a real-time network according to the state-of-the-art, FIG. 2 depicts an example of a stream and frames according to the state-of-the-art, FIG. 3 depicts an example realization of a node according to the state-of-the-art, FIG. 4 depicts an example of a communication scenario according to the state-of-the-art, FIG. 6 depicts constraints in array theory being used in a method according to the invention, and.

EXEMPLARY EMBODIMENTS

Figure 5:
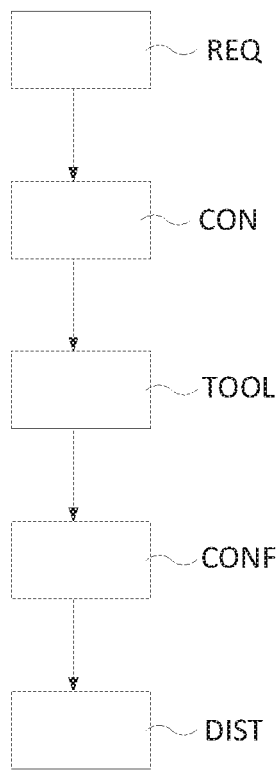
FIG. 5 depicts a flowchart of an example of a method according to the invention.

We discuss some of the many implementations of the invention next. If not stated otherwise, all details described in connection with a specific example are not only valid in connection with this example, but apply to the general scope of protection of the invention.

FIG. 1 depicts an example of a real-time network comprising eight nodes v1, . . . , v8 connected to each other with links E1a, E8a, E1b, E8b. In general, networks are modelled as a graph $\mathcal{F} = \{v, \varepsilon\}$, where $v$ is a set of nodes e.g., v1, . . . , v8, and E is a set of directed links e.g., E1a, . . . , E8a, E1b, E8b, connecting nodes to each other. If there exists a physical connection between two nodes $v_i$ and $v_j$ then this physical connection provides two links one link per communication direction, i.e., communication is possible in both direction between two nodes. Formally, if nodes $v_i$ and $v_j$ are connected to each other, then two directed links $e_{i,j}, e_{j,i} \in \varepsilon$ are defined. Nodes may be the source or destination of frames or may forward frames to other nodes. In one realization, the links may be Ethernet links and each node of the real-time network is one selected from a group consisting of an Ethernet switch, a router and an end station.

Nodes communicate with each other by the concepts of streams and frames. A stream (or flow) is a periodic multicast data transmission from one talker (the sender) to one or multiple listeners (the receivers). We denote the set of streams in the network with $\mathcal{S}$. We denote the route of a stream $s_i \in \mathcal{S}$ from talker $v_1$ to listener $v_n$ routed through the intermediary nodes (i.e. switches) $v_2, v_3, \ldots, v_{n-1}$ as $\mathcal{R}_i = [e_1, \ldots, e_{n-1}]$.

We assume that for each stream the sender and receiver nodes $v_1$, $v_n$, as well as the routed communication path connecting them are known. A stream $s_i \in \mathcal{S}$ is defined by the tuple $\langle C_i, T_i, L_i, J_i \rangle$, denoting the frame size in bytes, the period, the maximum allowed end-to-end latency, and the maximum allowed jitter of the stream, respectively.

The instance of a stream $s_i \in \mathcal{S}$ routed through link $e \in \varepsilon$ is defined by a set of frames $f_{i,j}^e \in \mathcal{F}_i^e$, where $\mathcal{F}_i^e \subset \mathcal{F}^e$ is the set of all frames of stream $s_i$ that are to be scheduled on link e. We denote the set of all frames routed through link e with $\mathcal{F}^e$. Since streams may have different periods resulting in an overall schedule cycle (also called hyperperiod) larger than any individual stream period, when constructing the GCL we must consider all instances of a specific stream repeating until the schedule cycle. Hence, a set $\mathcal{F}_i^e$ will have $T_s/T_i$ frames, where $T_s$ is the schedule cycle of all scheduled streams in the network, calculated as the least common multiple of the periods of all streams $s_i \in \mathcal{S}$. Additionally, each such periodic frame on link $e \in \varepsilon$ is characterized by a frame transmission duration $l_i^e$ calculated based on the data size $C_i$ of the stream $s_i$ and the speed of the egress port associated to the physical link e. For example, a minimum- and a maximum-sized Ethernet frame of 84 and 1542 bytes (including the IEEE 802.1Q tag) have a duration of 0.672 μsec and 12.336 μsec on a 1 Gbit/sec link, respectively.

FIG. 2 depicts an example stream and examples of frames in the example real-time network depicted in FIG. 1. In this example a stream S1 is shown in which node v1 is the sender and v7 and v8 are the receiver nodes. Communication along the stream is executed in form of frames, which are depicted as F1, F2, F3, and F4. In one realization the frames communicated may be Ethernet frames.

FIG. 3 depicts an example of a possible realization of an inner structure of a node. This example may be a realization of node v4 from the example network presented in FIG. 1. The node receives frames in its incoming links E1a, E2a, E3a. A switching logic SW1 decides to which outgoing link E5a the frames must be relayed and to which queue from a set of queues Q1, Q2, Q3, associated with the respective outgoing link E5a, the frames need to be placed. Furthermore, the figure depicts gates G1, G2, G3 associated with queues Q1, Q2, Q3. These gates are either in an open or in a closed state as indicated by configuration data GCL and the progress in time as indicated by a local clock C1. The node also maintains a transmission selection block TS that selects the next frame from the queues Q1, Q2, Q3 for transmission. The transmission selection TS will only select frames from a given queue Q1, Q2, Q3, if the associated gate G1, G2, G3 is in the open state.

FIG. 4 depicts an example on how the frames F1-F4 of the example stream S1 from FIG. 2 are scheduled and communicated in the example network of FIG. 1. The succeeding events of changing the state of a gate from closed to open and from open to closed define a window W1-W4. An array $\kappa_{i,j}^e$ denotes the assigned queue for each window on link $e \in \varepsilon$. We denote the maximum number of windows per link $e \in \varepsilon$ derived with $\mathcal{W}^e$.

In order to encode the scheduling problem in $T_A^{[\alpha]}$, we define for each link e two arrays, $\phi^e$ and $\tau^e$ over a sort array, containing the integer variables for, respectively, the open O1-O4 and close time instants C1-C4 of the windows indexed by the position in both arrays for the egress port associated to link e. Furthermore, we define for each frame instance $f_{i,j}^e \in \mathcal{F}_i^e$ a window index $\omega_{i,j}^e$ over the sort index representing the frame-to-window assignment index in both aforementioned arrays. Open O1-O4 and close C1-C4 time instants are measured with respect to a synchronized time in the network. The synchronized time can be established in the nodes, for example, by means of the IEEE 1588 standards and/or the IEEE 802.1AS standards and/or the SAE AS6802 standard or any revision of said standards.

FIG. 5 depicts a flowchart of a configuration method according to the invention. The flowchart consists of a first step REQ in which the communication requirements are collected. This can be done for example by means of a human user input or by autonomous requests from elements within the network. In one realization OPC Unified Architecture OPC/UA [3] is used for formulating these requests. In another realization Network Configuration Protocol (NETCONF) [4] and YANG [5] are used for formulating these requests. In another realization Data Distribution Service (DDS) [6] is used for formulating these requests. In another realization Simple Network Management Protocol (SNMP) [7] is used for formulating these requests. Once the communication requests are collected they are formulated as constraints in array theory in the second step CON. In the third step TOOL the constraints in array theory are provided to a tool that is capable of finding solutions to constraints formulated in array theory. In a fourth step CONF the tool returns configuration data that satisfy the constraints in array theory from step two CON. In a fifth step DIST at least some of the configuration data is distributed in the network and at least some of the node in the network will adapt at least some of the configuration data as their local configuration. This distribution may be executed by protocols, like OPC/UA, DDS, NETCONF/YANG, SNMP, etc.

Figure 6:
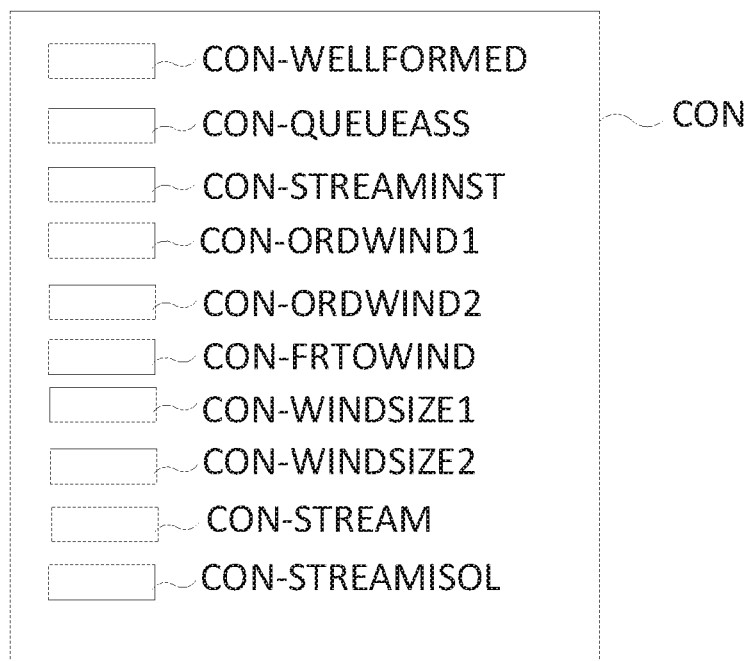

FIG. 6 depicts constraints in array theory. Usually, all of the constraints presented in the following are necessary, however, in certain applications only one or some of the constraints formulated below are provided.

Well-Formed Windows Constraints:

We first formalize logical constraints for all windows of an egress port. Since each physical link connects one egress port to one ingress port, we assume an equivalence in the formalism between an egress port and the connected directed edge (physical link). We constraint the open and close events of each window defined on that link to be greater than or equal to 0 and less than or equal to the schedule cycle of all streams in the network. Hence, we have the constraint CON-WELL-FORMED:

$\forall e \in \mathcal{E}: \forall k \in \{1, \ldots, \mathcal{W}^e\}$:

$(\phi^e[k] \geq 0) \wedge (\tau^e[k] < T_s)$.

where, as defined above, $T_s$ is the schedule cycle (hyperperiod) of all communication streams in the network.

Queue Assignment Constraints

Each window is assigned to an egress queue scheduled in the range [0 . . . MAX], therefore we add the bounds for the queue assignment array CON-QUEUEASS:

$\forall e \in \mathcal{E}: \forall k \in \{1, \ldots, \mathcal{W}^e\}$.

$0 \leq \kappa^e[k] < MAX$

Stream Instance Constraints

As discussed above, communication in network deployments rarely appear with a normalized period. Instead, streams are sourced at multiple rates which result in a hyperperiod defining the length of the schedule tables to be at least the least common multiple of all periods involved. The assignment of frames, and, as a consequence, the length of each window, is a result of the scheduler. Streams routed through the same link having different periods will contribute a number of frame instances, each to be scheduled within each period instance occurring until the hyperperiod. As a result, the open and close bounds for each window is further constraint to set the window.

For each stream $s_i$ routed through e we construct the following constraint CON-STREAMINST:

$$\forall s_i \in \mathcal{S}: \forall e \in \mathcal{E}: \forall j \in \left[0, \frac{T_s}{T_i} - 1\right]:$$

$$(\phi^e[\omega_{i,j}^e] \geq j \times T_i) \wedge (\tau^e[\omega_{i,j}^e] < (j+1) \times T_i).$$

Ordered Windows Constraints

An essential constraint for determinism is that no two frames transmitted on the same egress link are scheduled to overlap in the time domain. Moreover, we explicitly forbid multiple windows to remain open at the same to avoid the non-determinism introduced by contention.

Conceptually, the formulation of this constraint does not allow any two windows on the same link to overlap, which we define as CON-ORDWIND1:

$\forall e \in \mathcal{E}: \forall i,j \in \{1, \ldots, \mathcal{W}^e\}, i \neq j$:

$(\tau^e[i] \leq \phi^e[j]) \vee (\tau^e[j] \leq \phi^e[i])$

Note that this formulation results in a large number of assertions with a disjunction operator, which has proved to be computationally intensive. However, since the assignment of frames to windows is not restricted beforehand and any frame may be assigned to any window, we can simplify this constraint if the order of windows on each link is predefined offline, hence fixing their respective open and close events to be sequential. Therefore, the following alternative formulation may be used CON-ORDWIND2:

$\forall e \in \mathcal{E}: \forall i \in \{1, \ldots, \mathcal{W}^e - 1\}$, $\tau^e[i] \leq \phi^e[i+1]$ Frame-to-Window Assignment Constraints The frame-to-window assignment variable defines the index in the three arrays (open, close, and queue assignment) of the respective egress port. Thus, we restrict the variables to be no larger than the configurable maximum number of windows per port CON-FRTOWIND:

$\forall e \in \mathcal{E}: \forall f_{i,j}^e \in \mathcal{F}^e$:

$(\omega_{i,j}^e \geq 1) \vee (\omega_{i,j}^e \leq \mathcal{W}^e)$

Window Size Constraints

Since frames are assigned to windows by a scheduler, i.e., they are not known a-priori, the size of a window results from the accrued sum of the duration of all frames assigned to it. Hence, we must ensure that the close event of each window allows sufficient time to transmit the set of assigned frames. We note that this constraint is the first and only one in our formalism requiring the store operation of array theory.

We start by storing the uninterpreted term for each open variable in the respective position of the close array CON-WINDSIZE1:

$$\forall e \in \varepsilon: \forall k \in \{1, \ldots, \mathcal{W}^e\}:$$

$$\tau^e \langle k \leftarrow \phi^e[k] \rangle$$

This is equivalent to set all close events equal to the open event at the same index, therefore initializing the length the window to 0. Note that this way, the close event of all windows without any frame assigned will remain equal to the respective open event.

We now construct at each position in the close array the sum over the duration of all frames assigned to that window, using the frame-to-window assignment index CON-WINDSIZE2:

$$\forall e \in \varepsilon: \forall f_{i,j}^e \in \mathcal{F}^e:$$

$$\tau^e \langle \omega_{i,j}^e \leftarrow \tau^e[\omega_{i,j}^e] + l_i^e \rangle$$

The construct iterates for all frames, adding the frame duration to the previous uninterpreted value for the close event of the window to which the frame is assigned and storing the result at the same index as a new uninterpreted expression.

Stream Constraints

The stream constraints describe the sequential nature of communication from talkers to listeners. The generic condition is that frames belonging to the same stream must be scheduled sequentially with respect to time along the routed communication path. Hence, we have CON-STREAM:

$$\forall s_i \in \mathcal{S}: \forall e_k \in \mathcal{R}_i, k \in \{1, \ldots, n-1\}:$$

$$\forall j \in \left\{0, \ldots, \frac{T_s}{T_i} - 1\right\}:$$

$$\forall f_{i,j}^{e_k} \in \mathcal{F}_i^{e_k}:$$

$$\forall f_{i,j}^{e_{k+1}} \in \mathcal{F}_i^{e_{k+1}}:$$

$$\tau^{e_k}[\omega_{i,j}^{e_k}] + \delta \le \phi^{e_{k+1}}[\omega_{i,j}^{e_{k+1}}],$$

where δ is the constant value representing the network precision.

In other words, the propagation of frames of a stream follow the sequential order along the path. Therefore, the window open event of each frame has to be larger or equal than the close event of the window assigned to the predecessor frame, plus the network precision constant to compensate for clock differences between the two hops.

Stream Isolation Constraints

It is plausible that at runtime, a network may experience frame losses or streams showing differences in their periodic payload size. Therefore, to ensure that the execution of the schedule during runtime conforms to the offline planning we need to compute a schedule providing guarantees on the deterministic state of each queue at any given instant of time.

Consider the case in which two streams $s_i$ and $s_j$ are received from different links, $e_x$ and $e_y$, respectively, on device a and both forwarded to the same egress port on link $e_a$. If their frames are put in the same queue, the order of frames in that queue may differ during runtime depending on minimal variations on the exact order of arrival, or the processing mechanism for ingress ports in the switch fabric. Moreover, frame losses in one or the other stream may equally introduce differences in the queue state at each period instance. Hence, the offline scheduled opening and closing of the egress queue may effectively cause a different behavior at runtime induced by the non-deterministic state of the queue.

Guaranteeing determinism implies that all frames respect their computed window assignment throughout the operation of the network. For that, we need to either assign the respective frames of the two streams in the example above to the same window or else isolate them in the time domain, restricting that the frame of the second stream is not received until the frame of the other stream has already been scheduled for egress. Alternatively, if multiple queues are available for scheduled traffic we can isolate the two frames in windows of different queues, in which case they may as well be received within overlapping intervals without altering the run-time behavior.

Hence, we formulate the stream isolation condition for streams $s_i$ and $s_j$ sent on link $e_{a,b}$ as CON-STREAM-ISOL:

$$\forall k \in \left[0, \frac{T_s}{T_i} - 1\right]; \forall l \in \left[0, \frac{T_s}{T_j} - 1\right]:$$

$$((\tau^{e_a}[\omega_{i,k}^{e_a}] + \delta \le \phi^{e_y}[\omega_{j,l}^{e_y}]) \vee$$

$$(\tau^{e_a}[\omega_{j,l}^{e_a}] + \delta \le \phi^{e_x}[\omega_{i,k}^{e_x}])) \vee$$

$$(\kappa^{e_a}[\omega_{i,k}^{e_a}] \ne \kappa^{e_a}[\omega_{j,l}^{e_a}]) \vee$$

$$(\omega_{i,k}^{e_a} = \omega_{j,l}^{e_a}),$$

where the three disjunctive conditions guarantee that either one of the two frames is received when the other one has already been forwarded (by comparing the sequence of the respective open and close events of the windows assigned to each frame), or each is assigned to a different queue (and hence to a different window), or both frames are assigned to the same window (and hence to the same queue).

Figure 7:
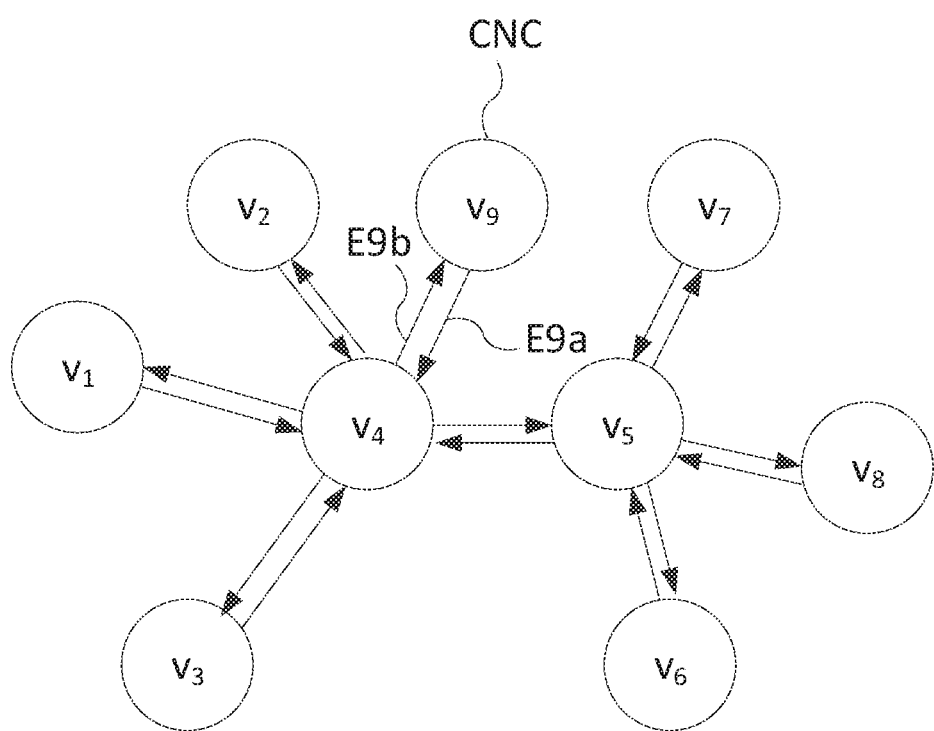
FIG. 7 depicts a device according to the invention for generating configurations for nodes in a real-time network.

FIG. 7 depicts a real-time network similar to the network in FIG. 1, however in this example of a network according to the invention an additional node v9 is used. This node v9 implements a device CNC where said tool is capable of solving constraints in array theory. Communication requirements can for example be communicated by a human user to the device CNC by a user interface. In another realization communication requirements can be autonomously provided by some of the nodes v1-v8 in network for example by means of standard network protocols and data models such as OPC/UA, DDS, NETCONF/YANG, SNMP, etc. In another realization node v9 may reside in a cloud-like infrastructure and the links E9a and E9b may be Internet connections (involving potentially many Ethernet links, switches, and routers).

REFERENCES

[1] Institute of Electrical and Electronics Engineers, "802.1Qbv—Enhancements for Scheduled Traffic," 2017. available from http://www.ieee802.org/1/pages/802.1bv.html.

[2] A. R. Bradley, Z. Manna and H. B. Sipma, "What's Decidable About Arrays?," in *VMCAI*, 2006.
[3] OPC Unified Architecture, available from https://opcfoundation.org/about/opc-technologies/opc-ua/
[4] Network Configuration Protocol (NETCONF) IETF RFC 6241, available from https://tools.ietf.org/html/rfc6241
[5] YANG—A Data Modeling Language for the Network Configuration Protocol (NETCONF) IETF RFC 6020, available from https://tools.ietf.org/html/rfc6020
[6] Data Distribution Service (DDS) available from http://www.omg.org/spec/DDS/1.4
[7] Simple Network Management Protocol (SNMP) e.g., version 3 IETF RFC 3411-3418, available from https://www.ietf.org/rfc.html That which is claimed is:

1. A method to configure nodes (v1, . . . , v8) in a real-time network, wherein the nodes (v1, . . . , v8) of the real-time network are connected with links (E1a, . . . , E8a, E1b, . . . , E8b) to each other directly or indirectly via other nodes (v1, . . . , v8) and communicate with each other using said links (E1a, . . . , E8a, E1b, . . . , E8b) by exchanging frames (F1, . . . , F4), the method comprising:

associating, by at least one node of the nodes (v1, . . . , v8), at least one queue (Q1, . . . , Q3) with at least one link of the links (E1a, . . . , E8a, E1b, . . . , E8b), wherein said at least one node (v1, . . . , v8) is connected to said at least one queue (Q1, . . . , Q3), and placing, by said at least one node (v1, . . . , v8), the frames (F1, . . . , F4) in said at least one queue (Q1, . . . , Q3) for transmission on the at least one link (E1a, . . . , E8a, E1b, . . . , E8b) associated with the at least one queue, wherein said at least one queue is associated with a gate (G1, . . . , G3) which comprises an open state or a closed state, wherein said at least one node selects (TS) the frames that are placed in said at least one queue on the at least one link associated with said at least one queue for transmission if a state of the gate associated with said at least one queue is in the open state, and does not select the frames for transmission from said at least one queue on said at least one link associated with said at least one queue when said gate is in the closed state, wherein said gate changes the state with a progress of time from open to closed and from closed to open to form windows (W1, . . . , W4) as indicated by configuration data (GCL), wherein said configuration data (GCL) is produced by a tool, wherein said tool is configured to solve constraints in array theory, wherein said tool accepts input that is formulated as constraints in the array theory (CON), wherein said input is provided to said tool by a human user and/or by communication requests from the nodes in the real-time network, wherein said configuration data (GCL) is communicated to the nodes (v1, . . . , v8) in the real-time network, wherein the nodes apply at least parts of said configuration data (GCL) as local configuration, and wherein some of the constraints in the array theory are well-formed windows constraints (CON-WELL-FORMED), queue assignment constraints (CON-QUEUEASS), stream instance constraints (CON-STREAMINST), ordered windows constraints (CON-ORDWIND1, CON-ORDWIND2), frame-to-window assignment constraints (CON-FRTOWIND), window size constraints (CON-WINDSIZE1, CON-WIND-SIZE2), stream constraints (CON-STREAM), and/or stream isolation constraints (CON-STREAMISOL), wherein the well-formed windows constraints are defined as $$\forall e \in \varepsilon: \forall k \in \{1, \ldots, \mathcal{W}^e\}:$$

$$(\phi^e[k] \geq 0) \wedge (\tau^e[k] < T_s),$$

where $T_s$ is a schedule cycle (hyperperiod) of all communication streams in the real-time network, wherein the queue assignment constraints are defined as $$\forall e \in \varepsilon: \forall k \in \{1z, \ldots, \mathcal{W}^e\}:$$

$$0 \leq \kappa^e[k] < \text{MAX},$$

wherein the stream instance constraints are defined as $$\forall s_i \in \mathcal{S}: \forall e \in \mathcal{E}: \forall j \in \left[0, \frac{T_s}{T_i} - 1\right]:$$

$$(\phi^e[\omega_{i,j}^e] \geq j \times T_i) \wedge$$

$$(\tau^e[\omega_{i,j}^e] < (j+1) \times T_i),$$

wherein a first ordered windows constraint of the ordered windows constraints is defined as $$\forall e \in \varepsilon: \forall i,j \in \{1, \ldots, \mathcal{W}^e\}, i \neq j:$$

$$(\tau^e[i] \leq \phi^e[j]) \vee (\tau^e[j] \leq \phi^e[i]),$$

wherein a second ordered windows constraint of the ordered windows constraints is defined as $$\forall e \in \varepsilon: \forall i \in \{1, \ldots, \mathcal{W}^e_{-1}\}:$$

$$\tau^e[i] \leq \phi^e[i+1],$$

wherein the frame-to-window assignment constraints are defined as $$\forall e \in \varepsilon: \forall f_{i,j}^e \in \mathcal{W}^e:$$

$$(\omega_{i,j}^e \geq 1) \vee (\omega_{i,j}^e \leq \mathcal{W}^e),$$

wherein a first window size constraint of the window size constraints is defined as $$\forall e \in \varepsilon: \forall k \in \{1, \ldots, \mathcal{W}^e\}:$$

$$\tau^e \langle k \leftarrow \phi^e[k] \rangle,$$

wherein a second window size constraint of the window size constraints is defined as $$\forall e \in \varepsilon: \forall f_{i,j}^e \in \mathcal{F}^e:$$

$$\tau^e \langle \omega_{i,j}^e \leftarrow \tau^e[\omega_{i,j}^e] + l_i^e \rangle,$$

wherein the stream isolation constraints is defined as $$\forall k \in \left[0, \frac{T_s}{T_i} - 1\right]: \forall l \in \left[0, \frac{T_s}{T_i} - 1\right]:$$

$$((\tau^{e_a}[\omega_{i,k}^{e_a}] + \delta \leq \phi^{e_y}[\omega_{j,l}^{e_y}]) \vee$$

$$(\tau^{e_a}[\omega_{j,l}^{e_a}] + \delta \leq \phi^{e_x}[\omega_{i,k}^{e_x}]) \vee$$

$$(\kappa^{e_a}[\omega_{i,k}^{e_a}] \neq \kappa^{e_a}[\omega_{j,l}^{e_a}]) \vee$$

$$(\omega_{i,k}^{e_a} = \omega_{j,l}^{e_a}),$$

wherein the stream constraints are defined as $$\forall s_i \in \mathcal{S} : \forall e_k \in \mathcal{R}_i, k \in \{1, \ldots, n-1\}:$$

$$\forall j \in \left\{0, \ldots, \frac{T_s}{T_i} - 1\right\}:$$

$$\forall f_{i,j}^{e_k} \in \mathcal{F}_i^{e_k}:$$

$$\forall f_{i,j}^{e_{k+1}} \in \mathcal{F}_i^{e_{k+1}}:$$

$$\tau^{e_k}[\omega_{i,j}^{e_k}] + \delta \leq \phi^{e_{k+1}}[\omega_{i,j}^{e_{k+1}}],$$

wherein v is a set of nodes and ε is a set of directed links connecting nodes to each other, wherein δ is a constant value representing a network precision, wherein a set of streams in the network with $\mathcal{S}$, wherein a stream $s_i \in \mathcal{S}$ is defined by a tuple $\langle C_i, T_i, L_i, J_i \rangle$, denoting a frame size in bytes, a period, a maximum allowed end-to-end latency, and a maximum allowed jitter of the stream, respectively, wherein a route of a stream $s_i \in \mathcal{S}$ from a talker $v_1$ to a listener $v_n$ routed through intermediary nodes $v_2$, $v_3 \ldots, v_{n-1}$ is denoted as $\mathcal{S}_i = [e_1, \ldots, e_{n-1}]$, wherein an instance of a stream $s_i \in \mathcal{S}$ routed through link $e \in \varepsilon$ is defined by a set of frames $f_{i,j} \in \mathcal{F}_i^e$, where $\mathcal{F}_i^e \subset \mathcal{F}^e$ is the set of all frames of stream $s_i$ that are to be scheduled on a link e, wherein $\mathcal{F}^e$ is the set of all frames routed through link e, wherein $T_s$ is the schedule cycle of all scheduled streams in the real-time network, wherein each periodic frame on link $e \in \varepsilon$ is characterized by a frame transmission duration $l_i^e$, wherein an array $\kappa_{i,j}^e$ denotes an assigned queue for each window on link $e \in \varepsilon$ in a range of [0 ... MAX], wherein $\mathcal{W}^e$ is a maximum number of windows per link $e \in \varepsilon$ derived, wherein for each link e two arrays, $\phi^e$ and $\tau^e$ over a sort array, containing integer variables for, respectively, open time instants and close time instants of the windows indexed by a position in said arrays for an egress port associated to link e, and wherein for each frame instance $f_{i,j}^e \in \mathcal{F}_i^e$ a window index $\omega_{i,j}^e$ over a sort index represents a frame-to-window assignment index in said arrays.

2. The method according to claim 1, wherein the tool comprises an SMT-solver that is configured to solve expressions in the array theory.

3. The method according to claim 1, wherein an OPC/UA, DDS, NETCONF/YANG, SNMP, FTP, or combination thereof is used to communicate communication requirements to said tool and/or to communicate configuration data (GCL) to the nodes (v1, ..., v8).

4. The method according to claim 1, wherein the nodes of the real-time network each comprise an Ethernet switch, a router, and/or an end station.

5. The method according to claim 1, wherein a state of the gate changes from open to closed and closed to open according the IEEE 802.1Qbv standard.

6. The method according to claim 1, wherein a synchronized time is established in the nodes by the IEEE 1588 standards, the IEEE 802.1AS standards, and/or the SAE AS6802 standard or any revision of said standards.

7. A device (CNC) to configure nodes (v1, ..., v8) in a real-time network, wherein the nodes (v1, ..., v8) of the real-time network are connected with links (E1a, ..., E8a, E1b, ..., E8b) to each other directly or indirectly via other nodes (v1, ..., v8) and communicate with each other using said links (E1a, ..., E8a, E1b, ..., E8b) by exchanging frames (F1, ..., F4), the device comprising:

at least one node of the nodes (v1, ..., v8) configured to associate at least one queue (Q1, ..., Q3) with at least one link of the links (E1a, ..., E8a, E1b, ..., E8b), wherein said at least one node (v1, ..., v8) is connected to said at least one queue (Q1, ..., Q3), wherein the at least one node (v1, ..., v8) is configured to place the frames (F1, ..., F4) in said at least one queue (Q1, ..., Q3) for transmission on the at least one link (E1a, ..., E8a, E1b, ..., E8b) associated with the at least one queue, wherein said at least one queue is associated with a gate (G1, ..., G3) which comprises an open state or a closed state, wherein said at least one node is configured to select (TS) only the frames that are placed in said at least one queue on the at least one link associated with said at least one queue for transmission if a state of the gate associated with said at least one queue is in the open state, and does not select the frames for transmission from said at least one queue on said at least one link associated with said at least one queue when said gate is in the closed state, wherein said gate changes the state with a progress of time from open to closed and from closed to open to form windows (W1, ..., W4) as indicated by configuration data (GCL), wherein the device is configured to produce configuration data (GCL) by executing a tool, where said tool is configured to solve constraints in array theory, wherein said tool is configured to accept input that is formulated as constraints in the array theory (CON), wherein said input is provided to said tool by a human user input and/or by communication requests from the nodes in the real-time network, wherein the device is configured to communicate said configuration data (GCL) to the nodes (v1, ..., v8) in the real-time network, wherein the nodes apply at least parts of said configuration data (GCL) as local configuration, and wherein some of the constraints in the array theory are well-formed windows constraints (CON-WELL-FORMED), queue assignment constraints (CON-QUEUEASS), stream instance constraints (CON-STREAMINST), ordered windows constraints (CON-ORDWIND1, CON-ORDWIND2), frame-to-window assignment constraints (CON-FRTOWIND), window size constraints (CON-WINDSIZE1, CON-WIND-SIZE2), stream constraints (CON-STREAM), and/or stream isolation constraints (CON-STREAMISOL), wherein the well-formed windows constraints are defined as $$\forall e \in \varepsilon : \forall k \in \{1, \ldots, \mathcal{W}^e\}:$$

$$(\phi^e[k] \geq 0) \wedge (\tau^e[k] < T_s),$$

where $T_s$ is a schedule cycle (hyperperiod) of all communication streams in the real-time network, wherein the queue assignment constraints are defined as $$\forall e \in \varepsilon : \forall k \in \{1, \ldots, \mathcal{W}^e\}:$$

$$0 \leq \kappa^e[k] < \text{MAX},$$

wherein the stream instance constraints are defined as $$\forall s_i \in \mathcal{S}: \forall e \in \mathcal{E}: \forall j \in \left[0, \frac{T_s}{T_i} - 1\right]:$$

$$(\phi^e[\omega_{i,j}^e] \geq j \times T_i) \wedge$$

$$(\tau^e[\omega_{i,j}^e] < (j+1) \times T_i),$$

wherein a first ordered windows constraint of the ordered windows constraints is defined as $$\forall e \in \mathcal{E}: \forall i,j \in \{1, \ldots, \mathcal{W}^e\}, i \neq j:$$

$$(\tau^e[i] \leq \phi^e[j]) \vee (\tau^e[j] \leq \phi^e[i]),$$

wherein a second ordered windows constraint of the ordered windows constraints is defined as $$\forall e \in \mathcal{E}: \forall i \in \{1, \ldots, \mathcal{W}^e - 1\}:$$

$$\tau^e[i] \leq \phi^e[i+1],$$

wherein the frame-to-window assignment constraints are defined as $$\forall e \in \mathcal{E}: \forall f_{i,j}^e \in \mathcal{F}^e:$$

$$(\omega_{i,j}^e \geq 1) \vee (\omega_{i,j}^e \leq \mathcal{W}^e),$$

wherein a first window size constraint of the window size constraints is defined as $$\forall e \in \mathcal{E}: \forall k \in \{1, \ldots, \mathcal{F}^e\}:$$

$$\tau^e\langle k \leftarrow \phi^e[k]\rangle,$$

wherein a second window size constraint of the window size constraints is defined as $$\forall e \in \mathcal{E}: \forall f_{i,j}^e \in \mathcal{F}^e:$$

$$\tau^e\langle \omega_{i,j}^e \leftarrow \tau^e[\omega_{i,j}^e] + l_i^e\rangle,$$

wherein the stream isolation constraints is defined as $$\forall k \in \left[0, \frac{T_s}{T_i} - 1\right]: \forall l \in \left[0, \frac{T_s}{T_j} - 1\right]:$$

$$((\tau^{e_a}[\omega_{i,k}^{e_a}] + \delta \leq \phi^{e_y}[\omega_{j,l}^{e_y}]) \vee$$

$$(\tau^{e_a}[\omega_{j,l}^{e_a}] + \delta \leq \phi^{e_x}[\omega_{i,k}^{e_x}]) \vee$$

$$(\kappa^{e_a}[\omega_{i,k}^{e_a}] \neq \kappa^{e_a}[\omega_{j,l}^{e_a}]) \vee$$

$$(\omega_{i,k}^{e_a} = \omega_{j,l}^{e_a}),$$

wherein the stream constraints are defined as $$\forall s_i \in \mathcal{S}: \forall e_k \in \mathcal{R}_i, k \in \{1, \ldots, n-1\}:$$

$$\forall j \in \left\{0, \ldots, \frac{T_s}{T_i} - 1\right\}:$$

$$\forall f_{i,j}^{e_k} \in \mathcal{F}_i^{e_k}:$$

$$\forall f_{i,j}^{e_{k+1}} \in \mathcal{F}_i^{e_{k+1}}:$$

$$\tau^{e_k}[\omega_{i,j}^{e_k}] + \delta \leq \phi^{e_{k+1}}[\omega_{i,j}^{e_{k+1}}],$$

wherein $\nu$ is a set of nodes and $\varepsilon$ is a set of directed links connecting nodes to each other,
wherein $\delta$ is a constant value representing a network precision,
wherein a set of streams in the network with $\mathcal{S}$,
wherein a stream $s_i \in \mathcal{S}$ is defined by a tuple $\langle C_i, T_i, L_i, J_i\rangle$, denoting a frame size in bytes, a period, a maximum allowed end-to-end latency, and a maximum allowed jitter of the stream, respectively,
wherein a route of a stream $s_i \in \mathcal{S}$ from a talker $v_1$ to a listener $v_n$ routed through intermediary nodes $v_2$, $v_3 \ldots, v_{n-1}$ is denoted as $\mathcal{R}_i = [e_1, \ldots, e_{n-1}]$,
wherein an instance of a stream $s_i \in S$ routed through link $e \in \varepsilon$ is defined by a set of frames $f_{i,j} \in \mathcal{F}_i^e$, where $\mathcal{F}_i^e \subset \mathcal{F}^e$ is the set of all frames of stream $s_i$ that are to be scheduled on a link e,
wherein $\mathcal{F}^e$ is the set of all frames routed through link e,
wherein $T_s$ is the schedule cycle of all scheduled streams in the real-time network,
wherein each periodic frame on link $e \in \varepsilon$ is characterized by a frame transmission duration $l_i^e$,
wherein an array $\kappa_{i,j}^e$ denotes an assigned queue for each window on link $e \in \varepsilon$ in a range of [0 ... MAX],
wherein $\mathcal{W}^e$ is a maximum number of windows per link $e \in \varepsilon$ derived,
wherein for each link e two arrays, $\phi^e$ and $\tau^e$ over a sort array, containing integer variables for, respectively, open time instants and close time instants of the windows indexed by a position in said arrays for an egress port associated to link e, and
wherein for each frame instance $f_{i,j}^e \in \mathcal{F}_i^e$ a window index $\omega_{i,j}^e$ over a sort index represents a frame-to-window assignment index in said arrays.

8. The device according to claim 7, wherein the tool comprises an SMT-solver configured to solve expressions in the array theory.

9. A real-time network comprising nodes (v1, ..., v8), wherein the nodes (v1, ..., v8) of the real-time network are connected with links (E1a, ..., E8a, E1b, ..., E8b) to each other directly or indirectly via other nodes (v1, ..., v8) and communicate with each other using said links (E1a, ..., E8a, E1b, ..., E8b) by exchanging frames (F1, ..., F4),
wherein at least one node of the nodes (v1, ..., v8) is configured to associate at least one queue (Q1, ..., Q3) with at least one link of the links (E1a, ..., E8a, E1b, ..., E8b), wherein said at least one node (v1, ..., v8) is connected to said at least one queue (Q1, ..., Q3),
wherein said at least one node (v1, ..., v8) is configured to place the frames (F1, ..., F4) in said at least one queue (Q1, ..., Q3) for transmission on the at least one link (E1a, ..., E8a, E1b, ..., E8b) associated with the at least one queue,
wherein said at least one queue is associated with a gate (G1, ..., G3) which comprises an open state or a closed state,
wherein said at least one node is configured to select (TS) the frames that are placed in said at least one queue on the at least one link associated with said at least one queue for transmission if a state of the gate associated with said at least one queue is in the open state, and does not select the frames for transmission from said at least one queue on said at least one link associated with the at least one queue when said gate is in the closed state,
wherein said gate changes the state with a progress of time from open to closed and from closed to open to form windows (W1, ..., W4) as indicated by configuration data (GCL), and
wherein for configuring nodes (v1, ..., v8) of the real-time network, the real-time network comprises at least one device according to claim 7.

10. The network according to claim 9, wherein an OPC/UA, DDS, NETCONF/YANG, SNMP, FTP, or combination thereof is used to communicate communication requirements to said tool and/or to communicate configuration data (GCL) to the nodes (v1, . . . , v8).

11. The network according to claim 9, wherein the nodes of the real-time network each comprise an Ethernet switch, a router and/or an end station.

12. The network according to claim 9, wherein a state change of the gate changes from open to closed and closed to open according the IEEE 802.1Qbv standard.

13. The network according to claim 9, wherein a synchronized time is established in the nodes by the IEEE 1588 standards, the IEEE 802.1AS standards, and/or the SAE AS6802 standard or any revision of said standards.

14. A real-time network comprising nodes (v1, . . . , v8), wherein the nodes (v1, . . . , v8) of the real-time network are connected with links (E1a, . . . , E8a, E1b, . . . , E8b) to each other directly or indirectly via other nodes (v1, . . . , v8) and communicate with each other using said links (E1a, . . . , E8a, E1b, . . . , E8b) by exchanging frames (F1, . . . , F4),
  wherein at least one node of the nodes (v1, . . . , v8) is configured to associate at least one queue (Q1, . . . , Q3) with at least one link of the links (E1a, . . . , E8a, E1b, . . . , E8b), wherein said at least one node (v1, . . . , v8) is connected to said at least one queue (Q1, . . . , Q3),
  wherein said at least one node (v1, . . . , v8) is configured to place the frames (F1, . . . , F4) in said at least one queue (Q1, . . . , Q3) for transmission on the at least one link (E1a, . . . , E8a, E1b, . . . , E8b) associated with the at least one queue,
  wherein said at least one queue is associated with a gate (G1, . . . , G3) which comprises an open state or a closed state,
  wherein said at least one node is configured to select (TS) the frames that are placed in said at least one queue on the at least one link associated with said at least one queue for transmission if a state of the gate associated with said at least one queue is in the open state, and does not select the frames for transmission from said at least one queue on said at least one link associated with the at least one queue when said gate is in the closed state,
  wherein said gate changes the state with a progress of time from open to closed and from closed to open to form windows (W1, . . . , W4) as indicated by configuration data (GCL), and
  wherein for configuring nodes (v1, . . . , v8) of the real-time network, the real-time network comprises at least one device according to claim 8.

\* \* \* \* \*